United States Patent [19]

Chang et al.

[11] Patent Number: 4,912,883
[45] Date of Patent: Apr. 3, 1990

[54] LAPPING CONTROL SYSTEM FOR MAGNETIC TRANSDUCERS

[75] Inventors: Mike Y. Chang, San Jose; Mark A. Church, Los Gatos; Michael P. Salo, San Jose, all of Calif.

[73] Assignee: International Business Machines Corporation, Armonk, N.Y.

[21] Appl. No.: 310,410

[22] Filed: Feb. 13, 1989

[51] Int. Cl.$^4$ .............................................. B24B 49/00
[52] U.S. Cl. ................................ 51/165 R; 51/165.71
[58] Field of Search ............... 51/71, 109 R, 121, 122, 51/165 R, 165.71; 29/593, 603; 324/226

[56] References Cited

U.S. PATENT DOCUMENTS

| | | | |
|---|---|---|---|
| 3,821,815 | 6/1974 | Abbott et al. | 29/603 X |
| 4,155,106 | 5/1979 | Muraoka et al. | 29/603 X |
| 4,477,968 | 10/1984 | Kracke et al. | 29/593 X |
| 4,509,295 | 4/1985 | Bottcher et al. | 324/226 X |
| 4,511,942 | 4/1985 | Valstyn | 29/603 X |
| 4,559,743 | 12/1985 | Kracke et al. | 51/281 R |
| 4,657,451 | 4/1987 | Tanaka | 324/226 X |
| 4,689,877 | 9/1987 | Church | 51/165 X |

FOREIGN PATENT DOCUMENTS

| | | | |
|---|---|---|---|
| 0186559 | 10/1983 | Japan | 51/165 R |
| 287408 | 6/1986 | Japan | 51/165 R |
| 0717722 | 2/1980 | U.S.S.R. | 51/165 R |

OTHER PUBLICATIONS

"Substrate Testing of Film Heads", Jones et al.; IEEE Trans. Magn., vol. 17, No, 6, p. 2896–2898 (1981).
Kawakami, et al.,; Electrical Detection of End Point in Polishing Process of Thin-Film Heads (Invited), J. Appl. Phys., vol. 61, No. 6, pp. 4613–4166 (1987).

*Primary Examiner*—Frederick R. Schmidt
*Assistant Examiner*—M. Rachuba
*Attorney, Agent, or Firm*—Otto Schmid, Jr.

[57] ABSTRACT

A lapping control system for a row of thin film magnetic transducers formed on a substrate. Each of the rows comprises a plurality of thin film magnetic transducers and at least two test structures. Each test structure has at least two elements which comprises some combination of switch elements or test thin film magnetic transducers. As the row of transducers is lapped, each time one of the switch elements is opened, the saturation current (ISAT) of one or more of the thin film magnetic transducers is measured and recorded so that a correlation between ISAT and throat height of the transducers is established during lapping. This correlation is used to establish the point at which lapping should be terminated.

17 Claims, 5 Drawing Sheets

LAPPING CONTROL SYSTEM FOR MAGNETIC TRANSDUCERS

FIELD OF THE INVENTION

This invention relates to a method and apparatus to control the manufacture of magnetic transducers, and in particular to a lapping control system for batch fabricating thin film magnetic heads.

DESCRIPTION OF THE PRIOR ART

In high speed data processing systems, magnetic disks have been employed for large memory capacity requirements. Data is read from and written onto the disks from magnetic transducers commonly called magnetic heads which are positioned over the disk during the storage and retrieval of data on tracks of the disks. The requirements for higher data density on the magnetic disks have imposed a requirement to read and write more data on narrower tracks located on the disk. In order to achieve maximum efficiency from the transducer or head element, the element or pole pieces must have a pole tip height dimension, commonly called throat height, which must be maintained within a certain limited tolerance for generating a maximum amount of electrical signals from a given head.

The conventional method for producing a required throat height includes a lapping system in which an abrasive grinding surface accurately grinds the pole tips to a desired length. Suitable techniques for controlling the throat height during the lapping operation are described in commonly assigned U.S. Pat. No. 4,689,877. In this patent, a technique is employed for measuring the resistance of lapping guide structures formed on each side of a row of transducers being lapped to a final throat height. The lapping guide structure is lapped along one dimension to the same extent as the transducer pole tips. The resistance of the lapping guide structure at any given time indicates the amount of material that has been removed and hence the resistance is an indication of the final throat height of the transducers being lapped.

Various techniques for calibrating the lapping guide structures to insure tracking to the throat height have been published, however, the basic problem, that the structure of the lapping guide does not match the structure of the magnetic head, remains. For this reason these techniques may not work to the precision required.

There have been suggestions that the magnetic head characteristics can be evaluated from a signal which is generated by the head itself. In the publication "Substrate Testing of Film Heads" by Jones et al, IEEE Trans. Magn., Vol. 17, No. 6, p. 2896-8(1981), a description is given of a test by which a measured inductance versus d.c. current through the head can be used to characterize saturation of the heads pole tips. Published Unexamined Japanese Patent Application No. 62-287408 utilizes a high frequency signal in addition to a d.c. bias current to periodically magnetically saturate a magnetic head and then senses the reduction of head impedance due to the saturation to determine the write characteristic of the head. The Kawakami et al publication, J. Appl. Phys., Vol. 61, No. 6, p. 4163-6 (1987) describes the use of a special magnetic head, in which the pole tips are closed, to determine the end point in a lapping operation by sensing the change in inductance when the pole tips are opened.

It can be shown that the write current which first saturates a magnetic head (ISAT) can be related to the throat height and head magnetic performance parameters, provided that the saturation takes place in the front region of the head.

The prior art techniques are useful so long as throat height is the controlling parameter. However, as the magnetic heads have become progressively smaller, the throat height, pole tip thickness, and gap thickness have all decreased. This has contributed to the fact that throat height is no longer the only important influence on head operational characteristics such as ISAT since normal process variations lead to significant variations in head characteristics. Therefore, wafer to wafer variations can cause significant departures from a pre-established correlation.

None of the prior art solutions to lapping control of thin film magnetic heads use as a control factor head characteristic correlations determined during the lapping operation.

SUMMARY OF THE INVENTION

It is therefore the principal object of this invention to provide a lapping control system for a thin film magnetic transducer in which the control parameter correlation is derived during the lapping operation from a characteristic of the thin film magnetic transducer.

In accordance with the invention, a lapping control system for accurately obtaining a desired throat height of each of a plurality of batch fabricated thin film magnetic transducers utilizes a row of thin film magnetic transducers formed on a substrate, with each of the rows comprising a height defining edge and at least two test structures. Each of the test structures comprises a combination of at least two elements, each offset a predetermined amount from the height defining edge. The first of the test structures comprises a switch structure and the second test structure comprises either another switch structure or a test thin film magnetic transducer. The row of thin film magnetic transducers is mounted in a position to lap the height defining edge, and during lapping a current flow is produced through at least one of the thin film magnetic transducers and the saturation current of at least one of the thin film magnetic transducers is measured and recorded each time one of the switch structures is opened so that a correlation between throat height and saturation current of the thin film magnetic transducers can be determined. The degree of lapping is then controlled, responsive to the measured saturation current, for terminating lapping when a predetermined throat height is reached for the thin film magnetic transducers based on the correlation established between saturation current and throat height during lapping.

According to a specific embodiment of the invention, the test structure comprises a plurality of switch structures each having a different predetermined offset with respect to the height defining edge and the thin film magnetic transducers are offset with respect to the height defining edge by an amount equal to the offset of the first switch structure.

According to another specific embodiment of the invention, the test structure comprises a switch structure and a test thin film magnetic transducer each offset an equal predetermined amount from the height defining edge. The thin film magnetic transducers are offset from the height defining edge an amount greater than the offset of the switch structure from the height defining edge.

According to a further specific embodiment of the invention, the test structure comprises a plurality of switch structures and a test thin film magnetic transducer. Each of the switch structures is offset a different predetermined amount from the height defining edge and the test thin film magnetic transducer is offset an amount equal to the offset of the first switch structure from the height defining edge. The thin film magnetic transducers are offset from the height defining edge an amount greater than the offset of the first switch structure from the height defining edge.

The foregoing and other objects, features and advantages of the invention will be apparent from the following more particular description of a preferred embodiment of the invention as illustrated in the accompanying drawings.

DESCRIPTION OF THE PREFERRED EMBODIMENT

The present invention is preferably for use in the fabrication of thin film magnetic head assemblies. The transducer portion of the thin film head is formed by depositing layers of magnetic material, electrically conductive material and pieces and magnetic gap necessary for the transducing function with a magnetic coating formed on a magnetic disk. A plurality of transducers are deposited onto a wafer which is then cut to form rows of the transducers with the transducers set in a side-by-side relationship. Each of the transducers comprises a thin film inductive read/write head. Test structures which will give a signal when a specified throat height is reached during lapping are deposited at each end of the row of transducers. The test structures are formed on the wafer at the same time that the transducers are deposited and the test structures are used to control lapping to the final throat height of the transducers. The wafer is then formed to become the slider of the magnetic head. The slider is mounted onto a suspension system which in turn is mounted onto an accessing system for locating the magnetic head onto tracks formed by the magnetic heads when writing onto the rotating disk. The lapping control system of the present invention, therefore, controls the lapping of a row of transducers in the batch fabrication process.

Figure 1:
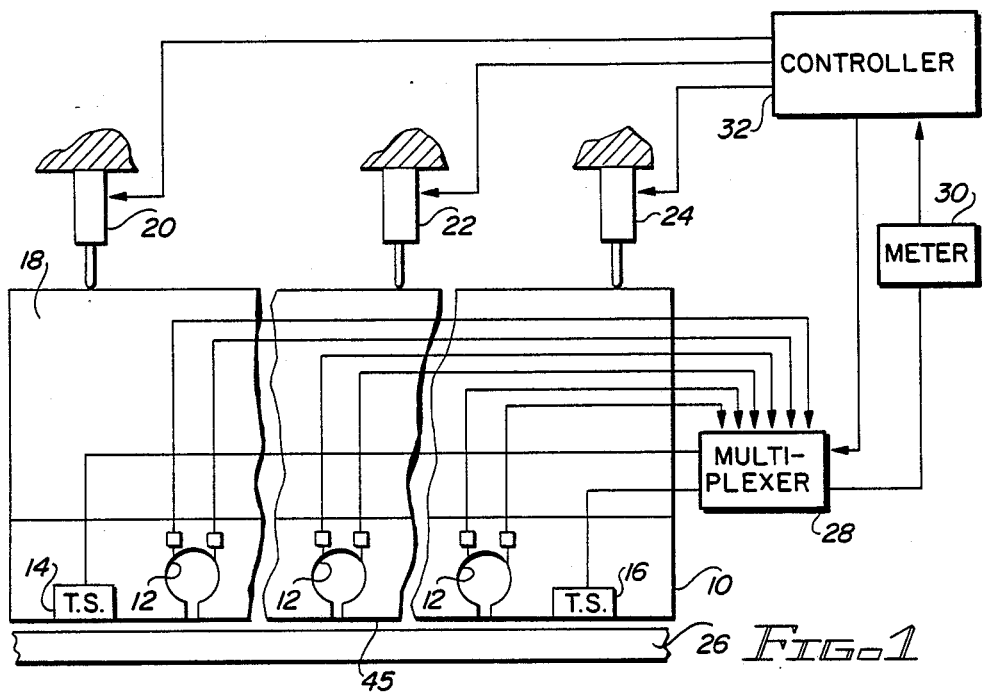
FIG. 1 is an overall system block diagram illustrating a lapping system incorporating the present invention.

Referring to FIG. 1, there is shown an overall system block diagram of a specific embodiment of apparatus that controls the lapping of a substrate row 10 having a plurality of product transducer elements 12 with test structures 14 and 16 located at the ends of the row 10. A larger number of test structures may be used, if desired. The purpose of the test structures 14 and 16 is to establish the saturation current (ISAT) as a function of throat height for row 10 during lapping as will be described in detail below. As stated previously, this one row 10 of transducers 12 and test structures 14 and 16 is but one section from the total wafer which includes a plurality of rows as well as a plurality of columns of transducer elements. The substrate row 10 is fastened to a holder 18, and placed against a plurality of actuators which position the substrate into a spaced relationship with a lapping plate 26. The actuators urge the substrate row 10 against the lapping plate 26 and control the amount of pressure placed against the holder 18. At least two actuators are required, with one actuator at each end of the row. However, more than two actuators may be used, particularly in cases in which row bow must be compensated. In the embodiment shown in the drawings, three actuators 20, 22 and 24 are used to control the pressure of row 10 against lapping plate 26. The lapping plate 26 is, as known to those skilled in the art, an abrasive surface which through relative motion affects lapping of the substrate row 10. The substrate row is lapped in order to remove material such that the throat of the transducers 12 can be precisely located as will be described in detail below.

The depth of the lapping provided by the lapping plate 26 is monitored through the two test structures 14 and 16. The test structures 14 and 16 are deposited on the substrate at the same time as various layers of the transducer elements 12 so that any process variations affect the transducer 12 and test structures 14 and 16 equally. At least one additional test structure is required in cases in which row bow must be considered. The test structures 14 and 16 provide a means for electrically determining the throat height for the transducer elements 12 as a function of ISAT, and the test structures are connected to a multiplexer 28. The multiplexer 28 senses the electrical resistance and ISAT for the test structures 14 and 16 and directs this information to a meter 30, and also sends the information to a controller 32. Meter 30 may comprise separate instruments for measuring resistance, current and inductance, if desired. The controller 32 in turn controls the three actuators 20, 22 and 24 such that the substrate row can be kept level by varying the pressure applied by each actuator. A desired lapping dimension can therefore be achieved under control of the test structures 14 and 16.

The most critical dimension for lapping transducer elements 12 is the throat height of the transducers, so it is a feature of the present invention that the transducer elements 12 are sensed directly during lapping, so that the correlation between ISAT and throat height can be determined dynamically on line for each of the transducers in that row 10 in conjunction with the test structures 14 and 16.

The inductance of a thin film magnetic head is a function of many parameters such as the number of turns of the coil, the magnetic properties of the core material, etc. It is also a function of the DC bias current passing through the coil. The magnetic flux generated by the bias current will eventually exceed the saturation magnetization in some part of the head core as the current is increased from zero. The current at which this happens is a function of head material properties and head geometry. The current at which this saturation occurs is called the saturation current (ISAT). For some magnetic heads ISAT is a strong function of throat height.

Figure 12:
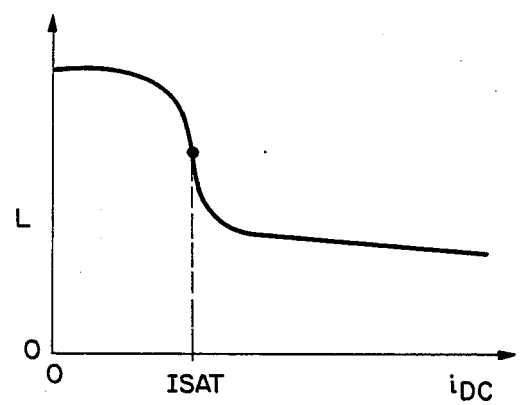
FIG. 12 is a plot of inductance vs current for a thin film magnetic head.

The manner in which inductance varies as a function of bias current is shown in FIG. 12. It can be seen that, when saturation occurs, there is a noticeable drop in the head inductance from the unsaturated state. The current at which the inductance drops is ISAT.

It can be seen from FIG. 12 that one way to measure ISAT is to increase the bias current from zero while monitoring the head inductance. This can be done under control of controller 32. Controller 32 includes a digitally controlled current source by means of which a stepped DC bias current can be applied to a selected thin film magnetic transducer 12 through multiplexer 28. Also included within controller 32 is a high frequency oscillator so that an AC signal can be superimposed on the DC bias current to aid in the inductance measurement.

Saturation current is continually monitored during lapping using the above procedure. Since ISAT increases as the throat height decreases, it can be used to control the lapping process.

The test structures 14 and 16 comprise a plurality of switches 34a-n each designed to be opened when a specific throat height is reached. Each time one of the switches is opened, the saturation current (ISAT) is measured and recorded for a specific one or more of the transducer elements 12. It is preferred that at least three transducer elements 12 be sensed so that an average value of ISAT vs throat height can be calculated and stored for each switch that is opened. It can be seen that many separate switches on a single test structure can be provided so that ISAT at many different throat heights can be found. These values of ISAT can be used to refine and improve the correlation of ISAT to throat height.

Figure 2:
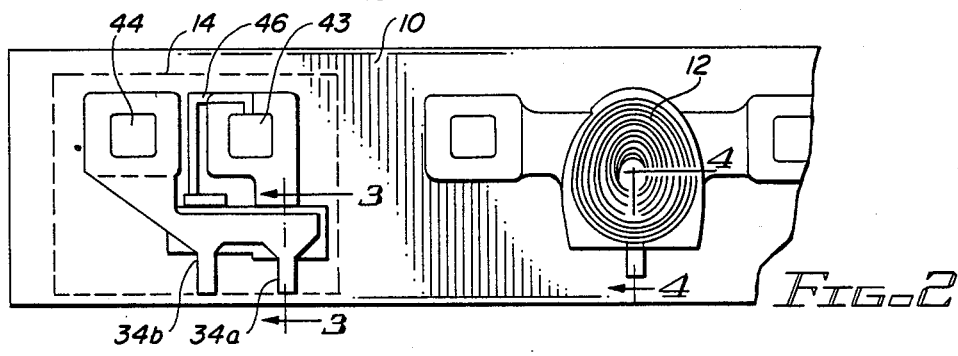
FIG. 2 is a diagram showing a first embodiment of the test structure of the lapping control system of FIG. 1.

Referring to FIG. 2, the arrangement of test structures 14 and 16 and transducer elements 12 for a specific embodiment of the present invention are shown. The test structures 14 and 16 have the same structure and are positioned at the ends of the row 10, and transducer elements 12 are positioned in a side-by-side relationship along row 10 between the test structures 14 and 16 as shown in FIG. 1. Only one test structure 14 is shown in FIG. 2, and this test structure comprises only two switches 34a and 34b since these switches sufficiently illustrate the structure.

The test structures 14 and 16 are deposited on the substrate at the same time as various layers of the transducer elements 12 to closely match the structure of the transducer elements 12. This can best be seen by referring to the cross section views in FIGS. 3 and 4.

Figure 3:
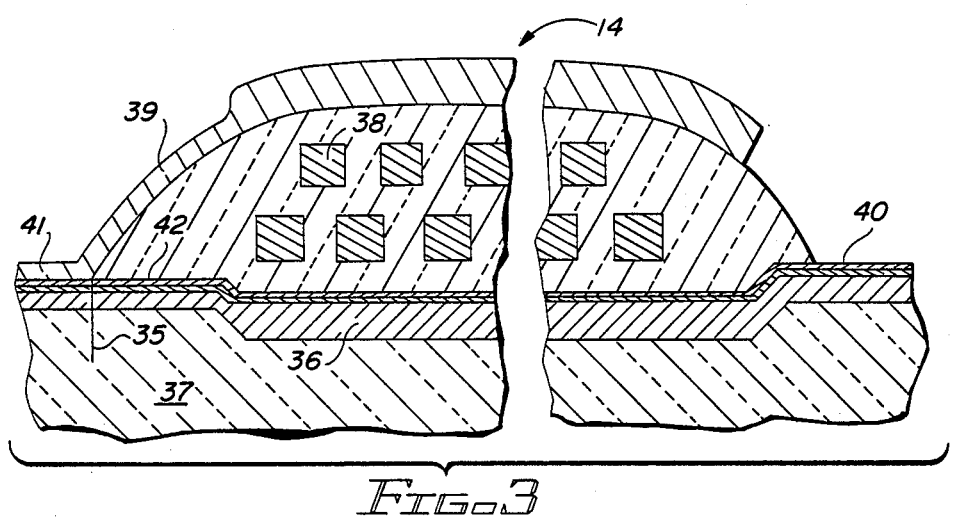
FIG. 3 is a cross-section view taken along lines 3—3 of FIG. 2.

FIG. 3 shows a cross-section view of the switch 34a of FIG. 2. The structure of other switches 34 is similar, and the switches comprise a first magnetic pole piece 36 deposited on substrate 37, and a conductor coil 38 which is electrically insulated from the first magnetic pole piece 36 and second magnetic pole piece 39. Note that pole pieces 36 and 39 are not in contact at the back gap region 40. To permit operation as a switch, a thin conductive layer 42 electrically contacts pole piece 39 in the pole tip region 41 and this layer 42 extends beyond back gap region 40 into electrical contact with terminal 43 (FIG. 2) of test structure 14. Pole piece 39 is in electrical contact with terminal 44.

Figure 4:
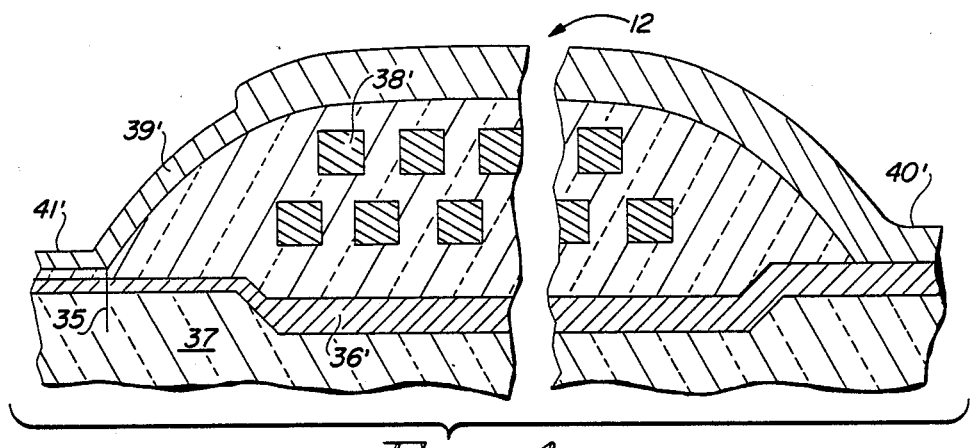
FIG. 4 is a cross-section view taken along lines 4—4 of FIG. 2.

The similarity between the structure of switch 34a and transducer element 12 can be seen by reference to FIG. 4. Transducer elements 12 comprise a magnetic yoke including a first magnetic pole piece 36' deposited on a suitable substrate 37 and second magnetic pole piece 39'. A conductor coil 38' has a plurality of turns, which can be in two or more layers, and the coil 38' is electrically insulated from both first magnetic pole piece 36' and second magnetic pole piece 39'. First and second magnetic pole pieces 36' and 39' are in contact at the back gap region 40' and separated by a thin nonmagnetic gap to form a transducing gap at the pole tip region 41. The throat height of transducer elements 12 is referenced to the so-called "zero throat position" 35 which is the point near the pole tip region 41 at which the two magnetic pole pieces 36' and 39' start to diverge. The throat heights for transducers 12 and the offsets for switches 34 and transducers 12 are referenced to the zero throat position.

Figure 5:
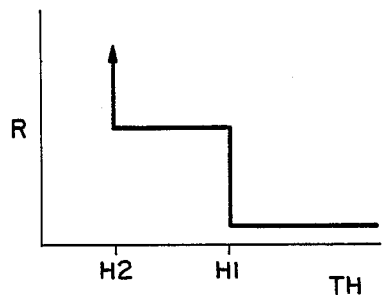
FIG. 5 is a plot of resistance vs throat height for the test structure shown in FIG. 2.
Figure 6:
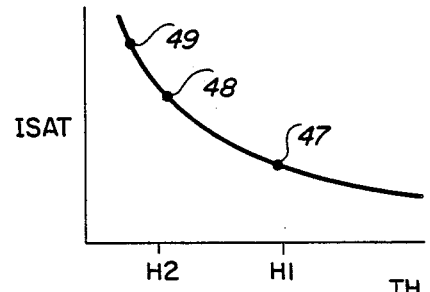
FIG. 6 is a plot of ISAT vs throat height for the test structure shown in FIG. 2.
Figure 7:
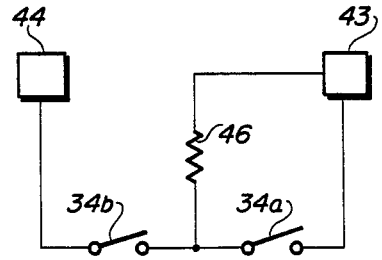
FIG. 7 is a schematic diagram of the test structure shown in FIG. 2.

The embodiment of the test structure 14 shown in FIG. 2 comprises two switches 34a, 34b with their zero throat position offset relative to each other so that two separate throat heights can be signalled. A schematic diagram of the test structure is shown in FIG. 5, and both switches 34a and 34b are originally closed so that the resistance between the two terminals (FIGS. 2 and 7) 43 and 44 is a low value. As row 10 is lapped from edge 45, switch 34a is opened to signal that row 10 has been lapped to a first throat height H1. This fact is recognized by controller 32 as a result of sensing the resistance between terminals 43 and 44. Upon the opening of switch 34a (i.e. edge 45 is lapped to the point at which layer 42 no longer contacts second magnetic pole piece 39 in switch 34a), the resistance sensed between terminals 43 and 44 increases to R which is the resistance of strip resistor 46. Resistor 46 is formed as a strip of high resistivity material such as chromium, for example, between terminal 43 and the second magnetic pole piece 39 of switch 34b. The value of ISAT for transducer element 12 is then recorded as point 47 in the throat height vs ISAT plot (FIG. 6). Lapping continues until switch 34b is opened of throat height H2 and at this time the resistance measured across terminals 43 and 44 goes to infinity (FIG. 5). The ISAT for transducer element 12 is then measured and plotted as point 48 as shown in FIG. 6.

The two measured points and the knowledge of how ISAT values normally vary with throat height permits a curve to be drawn as shown in FIG. 6. This relationship can be extrapolated to obtain an estimated point 49 to which the transducer elements 12 should be lapped.

Figure 9:
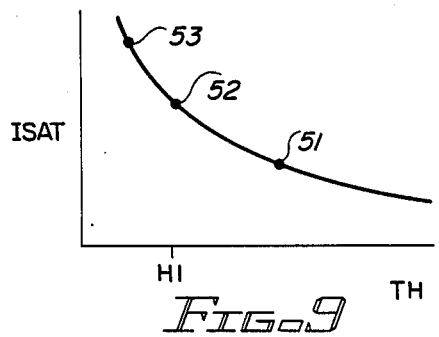
FIG. 9 is a plot of ISAT vs throat height for the test structure shown in FIG. 8.
Figure 8:
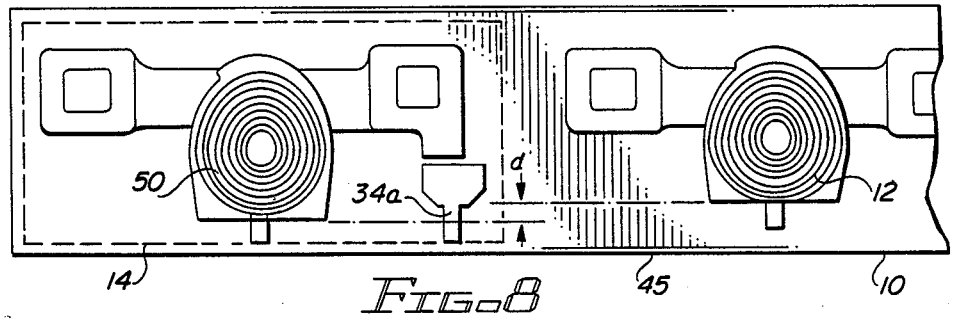
FIG. 8 is a diagram showing a second embodiment of the test structure of the lapping control system of FIG. 1.

A further embodiment of the test structure 14 and 16 shown in FIG. 8 comprises a single switch 34a and a test transducer element 50 which is offset with respect to switch 34a by a predetermined distance. The structure of test transducer element 50 is the same as the structure of transducer elements 12 with the exception that the zero throat point 35' is offset by a factor d with respect to the zero throat point 35 of the transducer elements 12. During lapping, at the time that switch 34a is opened, ISAT is measured for both transducer elements 12 and for test transducer element 50. These measured values give two measured points 51, 52 on the ISAT vs throat height curve as shown in FIG. 9. This embodiment of test structures 14 and 16 also permits extrapolation of the measured points to obtain an estimated point 53 to which the transducer elements 12 should be lapped.

The embodiments of test structure 14 and 16 shown in FIGS. 2 and 8 permit extrapolation of the measured data to obtain an estimated point to which the transducer elements 12 should be lapped. In some cases this does not provide sufficient accuracy to meet the requirements for a particular application. An embodiment of the test structure is shown in FIG. 10 which not only provides greater accuracy but also permits interpolation between measured points to determine the point at which lapping of the transducer elements 12 should be stopped.

Figure 10:
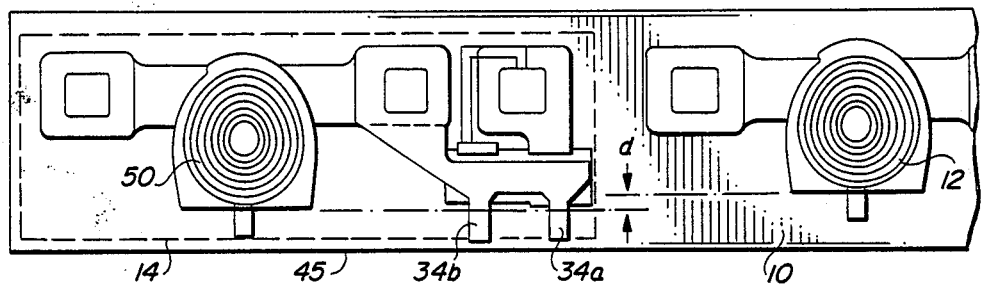
FIG. 10 is a diagram showing a third embodiment of the test structure of the lapping control system of FIG. 1.
Figure 11:
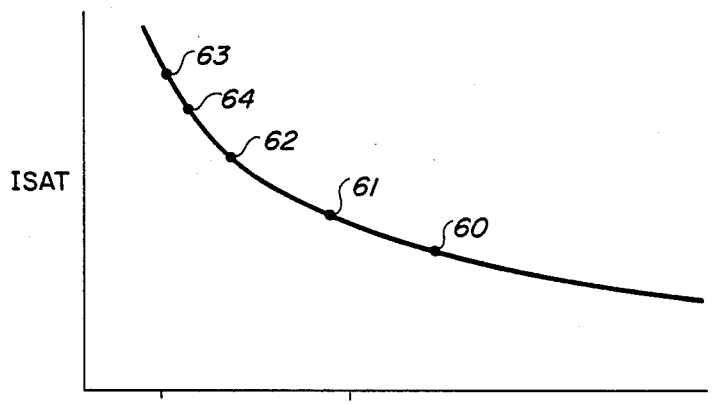
FIG. 11 is a plot of ISAT vs throat height for the test structure shown in FIG. 10.

The specific embodiment of the test structure 14 and 16 shown in FIG. 10 comprises at least two switches 34a and 34b and a test transducer element 50 each offset by a predetermined amount. The structure of the two switches 34a and 34b is the same as the corresponding elements in the FIG. 2 embodiment with switch 34b offset a greater amount than switch 34a, and the test transducer element 50 has the same structure as the corresponding element in the FIG. 8 embodiment. The zero throat position of transducer element 50 is offset by a factor d with respect to the zero throat position of the transducer elements 12, and the zero throat position of switches 34a and 34b are also offset by the same factor d. During lapping, at the time that switch 34a is opened, ISAT is measured for both transducer element 12 and for test transducer element 50. These measured values give two points 60, 62 on the ISAT vs throat height curve as shown in FIG. 11. As lapping progresses further, switch 34b is opened, and ISAT is measured for both transducer element 12 and for test transducer element 50 to provide two additional measured points 61, 63 on the curve as shown in FIG. 11. It is possible to interpolate from the measured ISAT values to establish the final throat height at point 64 rather than extrapolate to determine this value. This will provide a more accurate value for the final throat height.

It is possible to determine the ISAT vs throat height characteristics during lapping to any desired accuracy by the appropriate choice of combinations of switches and test transducer elements.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. A lapping control system for accurately obtaining a desired throat height of each of a plurality of batch fabricated thin film magnetic transducers comprising:
   a row of product thin film magnetic transducers formed on a substrate, said row comprising a height defining edge and at least two spaced test structures, each of said test structures comprising a combination of at least two elements each offset a predetermined amount from said height defining edge of said row, said first of said at least two elements comprising a switch structure and the second of at least two elements comprising either another switch structure or a test thin film magnetic transducer;
   means for mounting said row of product thin film magnetic transducers in a position to lap said height defining edge of each of said thin film magnetic transducers and said test structures;
   means for producing a current flow through at least one of said thin film magnetic transducers, and means for measuring the saturation current of said thin film magnetic transducers during lapping of said height defining edge;
   means for recording the value of saturation current for at least one thin film magnetic transducer each time a switch for the associated test structure is opened so that a correlation between throat height and saturation current of said thin film magnetic transducers can be determined based on the measured values and the known offset position of said switches of said test structure; and
   means responsive to the measured saturation current for controlling the degree of lapping for said row and for terminating said lapping process when a predetermined throat height is reached for said product thin film magnetic transducers based on the correlation established between saturation current and throat height during lapping.

2. The lapping control system of claim 1 wherein said product thin film magnetic transducers are each offset a predetermined amount from said switch structure in a direction away from said height defining edge.

3. A lapping control system for accurately obtaining a desired throat height of each of a plurality of batch fabricated thin film magnetic transducers comprising:
   a row of product thin film magnetic transducers formed on a substrate, said row comprising a height defining edge and at least two spaced test structures, each of said test structures comprising at least a first and a second switch structure each offset a different predetermined amount from said height defining edge of said row;
   means for mounting said row of product thin film magnetic transducers in a position to lap said height defining edge of each of said thin film magnetic transducers and said test structures;
   means for producing a current flow through at least one of said thin film magnetic transducers, and means for measuring the saturation current of said thin film magnetic transducers during lapping of said height defining edge;
   means for recording the value of saturation current for at least one of said thin film magnetic transducers each time a switch for the associated test structure is opened so that a correlation between throat height and saturation current of said thin film magnetic transducers can be determined based on the measured values and the known offset position of said switches of said test structure; and
   means responsive to the measured saturation current for controlling the degree of lapping for said row and for terminating said lapping process when a predetermined throat height is reached for said product thin film magnetic transducers based on the correlation established between saturation current and throat height during lapping.

4. The lapping control system of claim 3 wherein said product thin film magnetic transducers are each offset a predetermined amount from said switching structure in a direction away from said height defining edge.

5. The lapping control system of claim 4 wherein said product thin film magnetic transducers are each offset an amount greater than the offset of said second switch structure from said height defining edge.

6. The lapping control system of claim 3 wherein a shunt resistor is coupled across said first switch structure.

7. The lapping control system of claim 6 wherein said product thin film magnetic transducers are each offset a predetermined amount from said switch structure in a direction away from said height defining edge.

8. The lapping control system of claim 7 wherein said product thin film magnetic transducer are each offset an amount greater than the offset of said second switch structure from said height defining edge.

9. A lapping control system for accurately obtaining a desired throat height of each of a plurality of batch fabricated thin film magnetic transducers comprising:
a row of product thin film magnetic transducers formed on a substrate, said row comprising a height defining edge and at least two spaced test structures, each of said test structures comprising at least one switch structure offset a predetermined amount from said height defining edge of said row and at least one test thin film magnetic transducer also offset from said height defining edge of said row;
means for mounting said row of product thin film magnetic transducers in a position to lap said height defining edge of each of said thin film magnetic transducers and said test structures;
means for producing a current flow through at least one of said product thin film magnetic transducers, and means for measuring the saturation current of said thin film magnetic transducers during lapping of said height defining edge;
means for recording the value of saturation current for said thin film magnetic transducer and said test thin film magnetic transducer each time a switch for the associated test structure is opened so that a correlation between throat height and saturation current of said thin film magnetic transducers can be determined based on the measured values and the known offset position of said switches of said test structure; and
means responsive to the measured saturation current for controlling the degree of lapping for said row and for terminating said lapping process when a predetermined throat height is reached for said thin film magnetic transducers based on the correlation established between saturation current and throat height during lapping.

10. The lapping control system of claim 9 wherein said product thin film magnetic transducers are each offset a predetermined amount greater than said test structures from said height defining edge.

11. The lapping control system of claim 10 wherein said predetermined amount of offset of said product thin film magnetic transducers is greater than the offset of said test thin film magnetic transducer from said height defining edge.

12. A lapping control system for accurately obtaining a desired throat height of each of a plurality of batch fabricated thin film magnetic transducers comprising:
a row of product thin film magnetic transducers formed on a substrate, said row comprising a height defining edge and at least two spaced test structures, each of said test structures comprising at least a first and a second switch structure each offset a different predetermined amount from said height defining edge and at least one test thin film magnetic transducer offset from said height defining edge;
means for mounting said row of product thin film magnetic transducers in a position to lap said height defining edge of each of said thin film magnetic transducers and said test structures;
means for producing a current flow through at least one of said thin film magnetic transducers, and means for measuring the saturation current of said thin film magnetic transducers during lapping of said height defining edge;
means for recording the value of saturation current for said thin film magnetic transducer and said test thin film magnetic transducer each time a switch for the associated test structure is opened so that a correlation between throat height and saturation current of said thin film magnetic transducers can be determined based on the measured values and the known offset position of said switches and said test transducer of said test structure; and
means responsive to the measured saturation current for controlling the degree of lapping for said row and for terminating said lapping process when a predetermined throat height is reached for said product thin film magnetic transducers based on the correlation established between saturation current and throat height during lapping.

13. The lapping control system of claim 12 wherein said product thin film magnetic transducers are each offset a predetermined amount greater than said test structures from said height defining edge.

14. The lapping control system of claim 13 wherein said product thin film magnetic transducers are each offset an amount greater than the offset of said test thin film magnetic transducer from said height defining edge.

15. The lapping control system of claim 12 wherein a shunt resistor is coupled across said first switch structure.

16. The lapping control system of claim 15 wherein said product thin film magnetic transducers are each offset a predetermined amount greater than said test structures from said height defining edge.

17. The lapping control system of claim 16 wherein said product thin film magnetic transducers are offset an amount greater than the offset of said test thin film magnetic transducer from said height defining edge.

* * * * *